(12) United States Patent
Taaghol et al.

(10) Patent No.: US 8,169,935 B2
(45) Date of Patent: May 1, 2012

(54) MULTI-RADIO CONNECTION MANAGEMENT AND BUNDLING USING WEB BROWSERS

(75) Inventors: Pouya Taaghol, San Jose, CA (US); Ashok Sunder Rajan, Burnaby (CA)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 12/645,218

(22) Filed: Dec. 22, 2009

(65) Prior Publication Data

US 2011/0149797 A1 Jun. 23, 2011

(51) Int. Cl.
*H04L 12/28* (2006.01)

(52) U.S. Cl. ....................... 370/254; 370/401

(58) Field of Classification Search .................. 370/254, 370/328, 338, 400, 401
See application file for complete search history.

(56) References Cited

U.S. PATENT DOCUMENTS

| | | | |
|---|---|---|---|
| 2007/0019670 A1* | 1/2007 | Falardeau | 370/465 |
| 2007/0253339 A1* | 11/2007 | Ovadia et al. | 370/252 |
| 2009/0207817 A1* | 8/2009 | Montemurro et al. | 370/338 |
| 2010/0027468 A1* | 2/2010 | Rajadurai et al. | 370/328 |

* cited by examiner

*Primary Examiner* — Hong Cho
(74) *Attorney, Agent, or Firm* — Carrie A. Boone, P.C.

(57) ABSTRACT

A method to enable browsers to manage connections across access networks is disclosed. The method manages network connections using a simple standard browser with the least amount of user interaction for all connections. The method uses standardized WiMAX activation and provisioning schemes for the management of connection profiles across the different access technologies.

20 Claims, 7 Drawing Sheets

Figure 1

| client connections | browser | VOIP clients | | email | others (IM,....) | |
|---|---|---|---|---|---|---|
| protocol | TCP/IP | UDP | | NetBEUI | others | |
| | iConnected (100) | | | | | |
| driver | WiFi CU | WiFi profiles | 3G CU | 3G profiles | ⋮ | Ethernet CU | Ethernet profiles | WiMAX CU | WiMAX ND&S profiles |
| | driver | driver | | driver | driver |
| hardware | network adapter (WiFi) | network adapter (3G) | | network adapter (Ethernet) | network adapter (WiMAX) |

Case 1: No adapter connected, i.e., none of the adapters has an IP address:
{
    iConnected attempts to sniff access providers through all the adapters and attempts to acquire an IP address
        Case: IP address obtained:
            iConnected constructs an ICMP ping packet and attempts to reach a public destination
                On Failure:
                    Repeat for all access points across adapters
            if
                (Cached registrations and preference list available)
                    Connect to the registered access point highest in the preference order
                Else
                {
                    Refer available access point profiles;
                    Determine access point parameters -- signal strength, security strength, cost, partner networks;
                    Present options with parameters dashboard page to user;
                }
}

Case 2: A stale connection on only one of the adapters:
{
    iConnected constructs an ICMP ping packet and attempts to reach a public destination On Failure:
        Recursively execute Case 1
}

Figure 7

MULTI-RADIO CONNECTION MANAGEMENT AND BUNDLING USING WEB BROWSERS

TECHNICAL FIELD

This application relates to network connectivity and, more particularly, to a mechanism for establishing a wireless connection using available network adapters in a system.

BACKGROUND

A device such as a laptop computer may feature multiple network adapters. Each of these network adapters generally includes some sort of a connection utility or connection manager for coupling the adapter to a network, such as the Internet. The network adapters may also feature an associated driver that needs to be executed before the network adapter is operable.

Currently, the connection management between the network adapters and the network is performed in traditional software connection managers. There may be many connection managers loaded on the device for managing for the same wireless technology. For example, there may be a connection manager from the operating system, a second connection manager from the module manufacturer, and a third connection manager from the original equipment manager (OEM). This often leads to use confusion and a complex initial setup for new technologies, including for WiMAX, short for worldwide interoperability for microwave access. WiMAX is currently defined by the IEEE (Institute of Electrical and Electronics Engineers) 802.16-series specification.

Further with multiple radios (WiFi, WiMAX, 3G) available on the same device, a unified multiple-communication connection manager to manage connections across these different access technologies is hard to deploy and use.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a method to enable different client applications, including browsers, VOIP, electronic mail, instant messaging, and so on, to manage connections across access networks, is disclosed. The method, known as iConnected, manages network connections using a simple standard browser or other user interface with the least amount of user interaction for all connections. The iConnected method uses standardized activation and provisioning schemes for the management of connection profiles across the different access technologies. In contrast to prior art solutions, iConnected ensures that, where the combination of networks and network adapters is available, a connection to the Internet is established.

Figure 1:
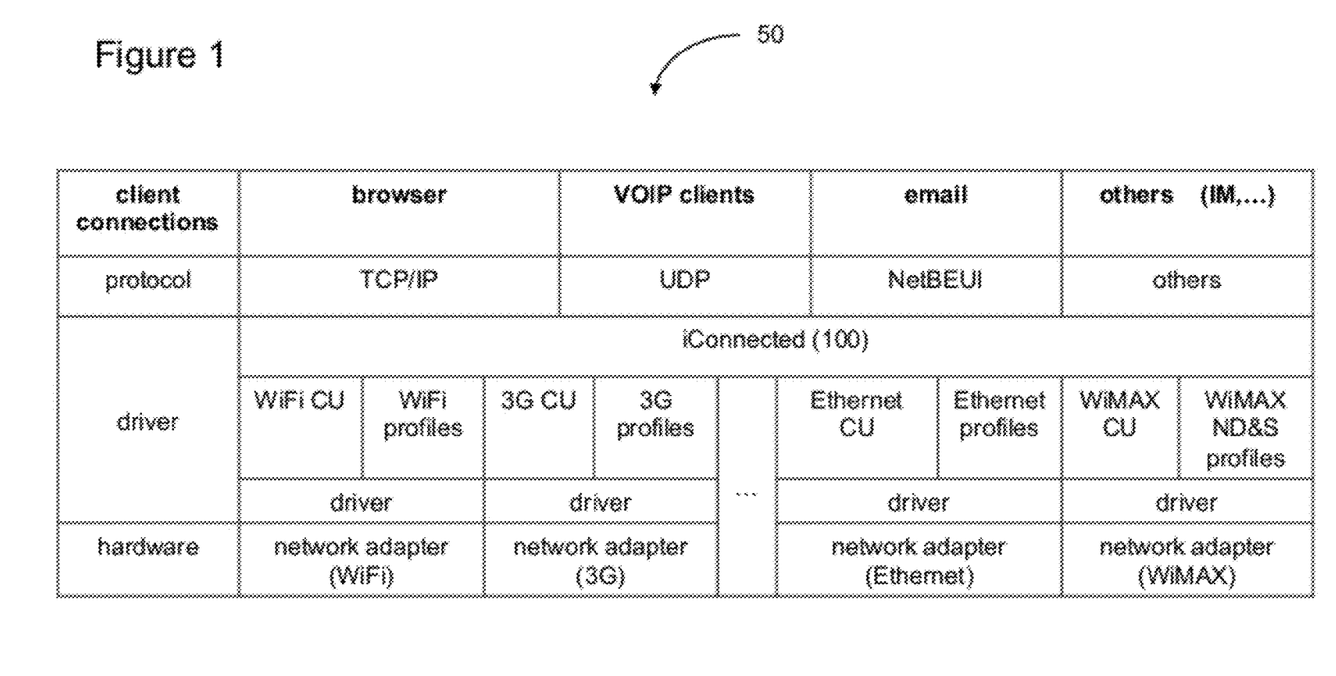
FIG. 1 is a table showing how iConnected fits into existing technologies, according to some embodiments.

FIG. 1 is a schematic diagram of a table 50 including a driver shim, known herein as iConnected 100, to enable different client applications, such as browsers, VOIP, electronic mail, instant messaging, and so on (hereinafter, "client connections"), to manage connections across access networks, according to some embodiments. The iConnected method 100 is a cross-network adapter connectivity monitor that determines the ability of a device, such as a laptop computer, to reach an intended destination service, such as an Internet site or service provider portal/server, through at least one of the available physical network adapters located within the device.

The table 50 in FIG. 1 features both hardware and software components for a typical laptop computer or other processor-based system having multiple network adapters. The top row of the table 50 shows listed client connections, including browsers, voice-over-Internet protocol (VOIP) clients, email clients, or other clients, such as instant messaging (IM) clients. The client connections work with a second layer, the protocol layer, usually from the operating system of the device. The operating system offers different connectivity transports, whether TCP/IP (transmission control protocol/internet protocol), UDP, (user datagram protocol), NetBEUI (network basic input-output system, BIOS, extended user interface), or others.

The mapping between the client connections and the protocols is not strictly one-to-one. Instead, the mapping may be one-to-many, as each of these client applications may use one or more of the transports to get connected to the Internet.

Although the device may be populated with more network adapters, four adapters are shown in FIG. 1: a WiFi network adapter, a 3G network adapter, an Ethernet network adapter, and a WiMAX network adapter. In the driver section of the table, each adapter is associated with a distinct connection utility (CU), one or more adapter profiles, and an adapter driver.

The connection utility is essentially the user interface seen by a user of the device, when connecting to the network adapter. So, for example, the device may include, separate and distinct from one another, a WiFi connection utility, a WiMAX connection utility, and a 3G connection utility. These connection utilities may be part of an operating system or may be software programs bundled with the network adapter, as examples.

The WiFi network adapter connects to a modem, a router, or a combination modem/router (together referred to as the access point), to establish a connection between the device and a network such as the Internet. Many homes and offices feature modems and/or routers for this purpose. Similarly, the WiMAX network adapter connects to the Internet through the WiMAX base station (BS) and access gateway, and a 3G adapter would connect through the 3G base station and gateway to the Internet. The access points or the base station belong to a private (as in a home/office network provider) or commercial (as in Clearwire, Sprint, Boingo, etc.) network provider.

The network adapters need to be provisioned with the right connection profile to establish a connection through the network provider to the Internet. Connection profiles attached to any of the network adapters are built over time, as the user travels across different locations and establishes accounts with different network providers. The connection profile contains the connection parameters and credentials for connecting to the access points or base station of the network provider at a given location.

Once an account is established with a network provider, the connection profile is provisioned to the adapter by a process called bootstrap for activation and provisioning. Once the adapter has been activated and provisioned through the bootstrap process, the profile is bound to the adapter until it is deleted or purged.

The iConnected method 100 is a type of cross-adapter driver, in some embodiments. As indicated in the table 50, iConnected 100 operates across physical adapters and knows how to work with each type of network adapter. The iConnected method 100 helps decide which of the available adapters is fastest and easiest for connection to the network. The iConnected method 100 is thus a "wedge" or "glue" between the applications, the operating system, and the physical adapter through which applications connect to the Internet or remote service.

Figure 2:
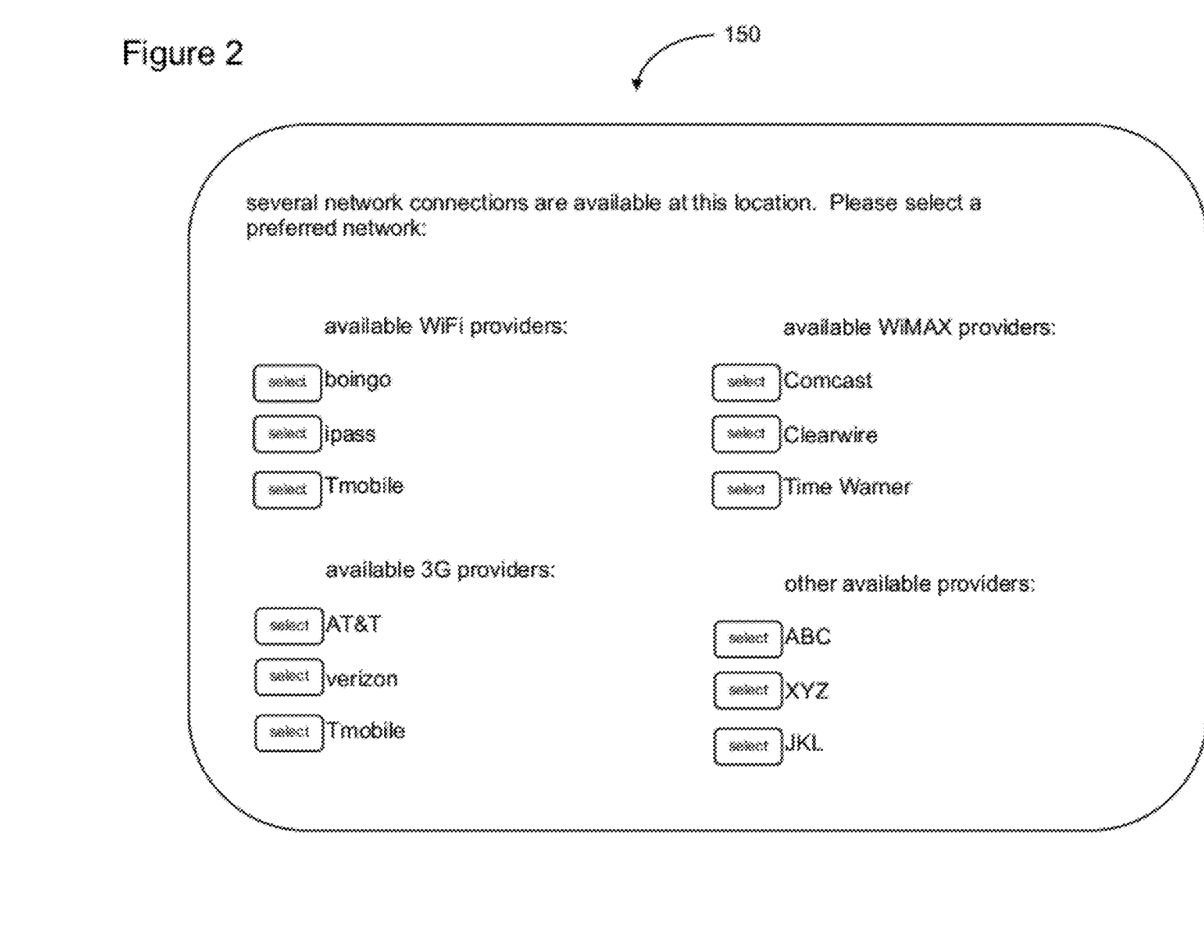
FIG. 2 is a block diagram of a dashboard interface generated by iConnected, according to some embodiments.

The iConnected method 100 does much of its work out of the view of the device user. Where user interaction is needed, however, iConnected presents a browser page 150 to the user, known herein as a dashboard 150. The dashboard 150 may be presented as a browser application or as any other user interface application. FIG. 2 is a simplified view of a dashboard 150, according to some embodiments. For the each of the available network adapters in the device, iConnected 100 determines which networks are connectable to those devices. Where the device is at a location where any of the network adapters on the device are provisioned to connect to the Internet through the available access points or base station at the location, such as when the device is at a home office, the dashboard 150 is not seen by the device user. Instead, where the user accesses a network, the connection is made automatically. When the location of the device changes and none of the available network adapters on the device are provisioned to connect through the available access points or base station at the location, however, the dashboard 150 may be presented to the user with the different connection options available for selection.

Figure 3:
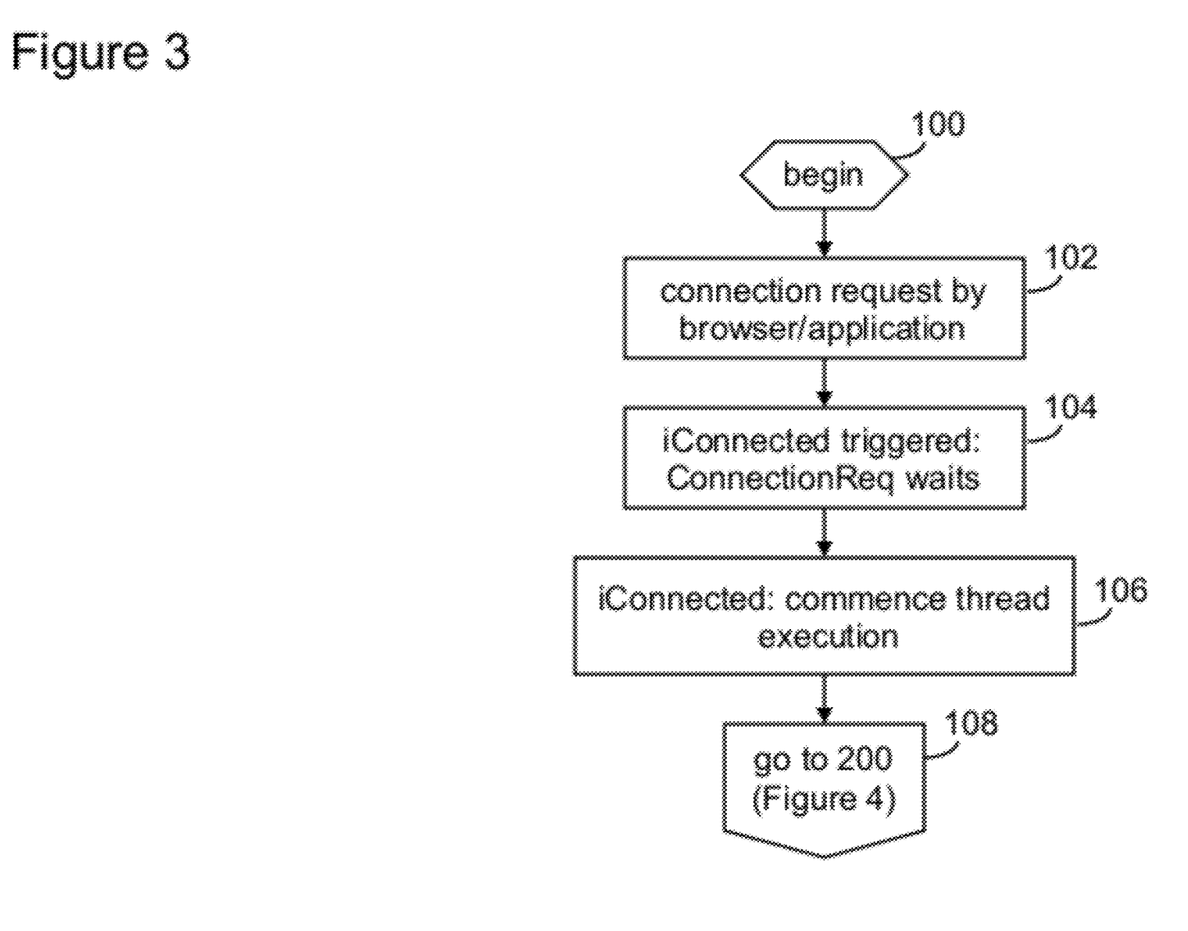
FIGS. 3, 4, and 5 are flow diagrams showing the operation of the iConnected method of FIG. 1, according to some embodiments.
Figure 4:
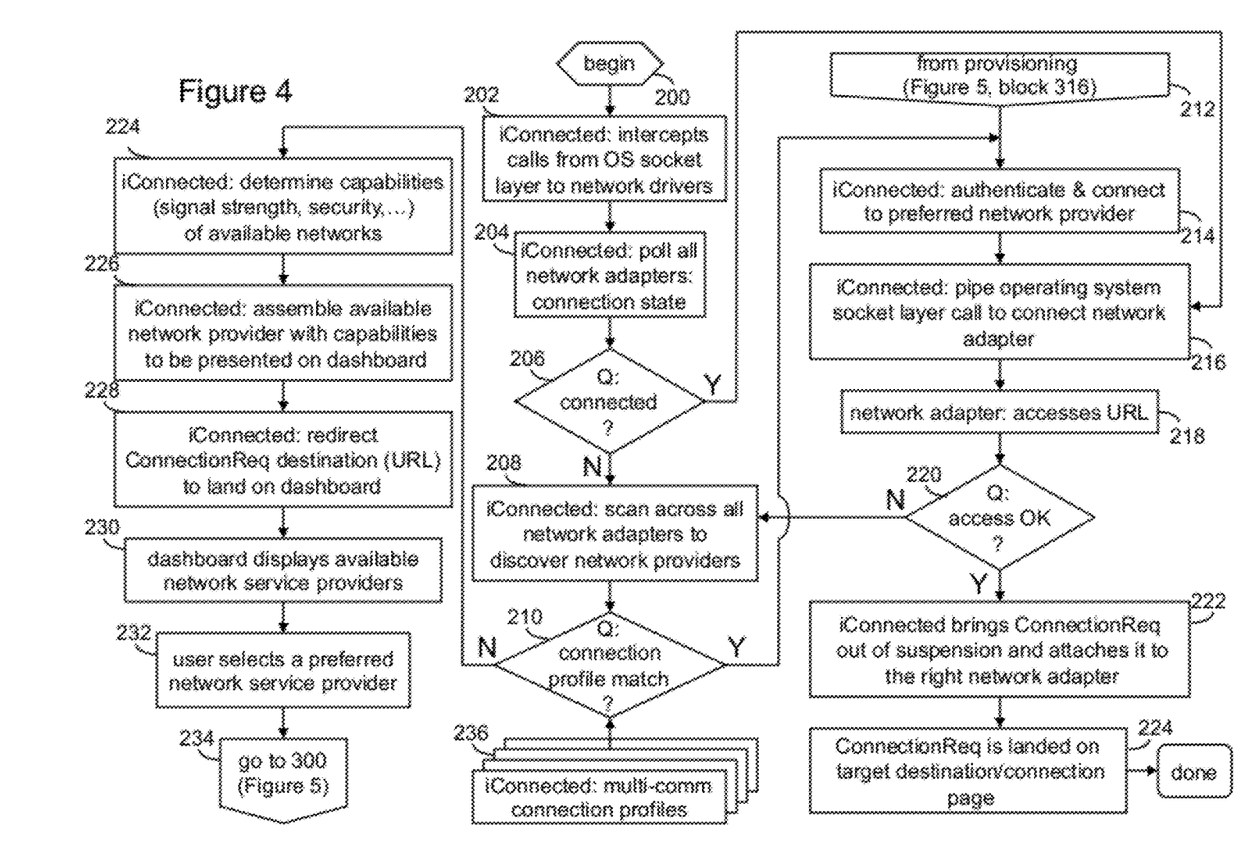
Figure 5:
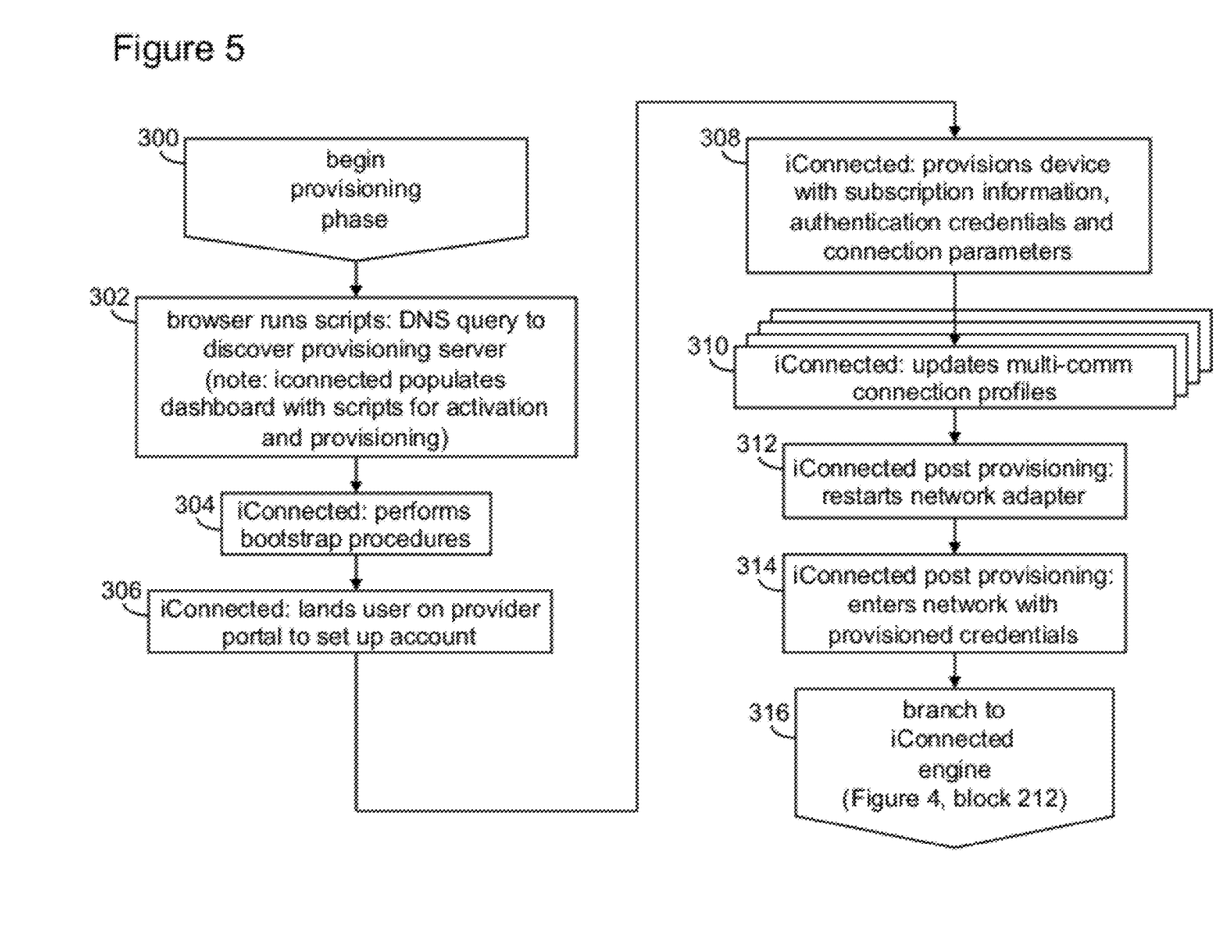

FIGS. 3, 4, and 5 are flow diagrams showing operation of the iConnected method 100, according to some embodiments. In FIG. 3, a connection request is made by a browser or other client connection (block 102). The user may be trying to use email, access the Internet, or initiate a voice-over IP call, with each of these operations being associated with an application or client (FIG. 1) to reach a destination on the Internet. When opening a browser, the user may be trying to access a popular website, such as amazon.com or ebay.com. So, the browser sends a hyper-text transport protocol (HTTP) connection request over TCP port 80. The application would send a connection request, known as ConnectionReq. However, iConnected 100 intercepts that connection request (block 104). This interception is done by iConnected 100 without any user awareness. The connection request is held in abeyance while iConnected 100 commences thread execution, including network discovery and selection (block 106). The iConnected method 100 performs network discovery and selection by looking at all of the available adapters within the device, and seeing which ones, if any, have a network connected to them. The iConnected thread execution, including network discovery and selection operations, is described more fully in the flow diagram of FIG. 4, below.

FIG. 4 provides a more detailed understanding of the thread execution portion of the iConnected method 100, according to some embodiments. What is accomplished during the iConnected thread execution is that iConnected 100 will figure out which network adapters are present and which ones have the correct provisioning parameters to connect to the access points or base station of the network providers at the location. If any one of the network adapters on the device has the correct connection profile to establish a connection to the Internet through any one of the available network providers at the location, the iConnected 100 thread execution will return with the URL associated with the requested browser unchanged. If, on the other hand, none of the network adapters on the device have a valid connection profile to establish a connection to the Internet through any one of the network providers at the location, the iconnection 100 thread execution will return with a redirection to the dashboard 150 for the user to select the preferred network provider.

The thread execution 200 commences with iConnected intercepting a call from the operating system socket layer to network drivers (block 202), allowing iConnected to take over the operation previously performed by the application/client. The iConnected method 100 then polls all the network adapters in the device, looking for a connection state (block 204). If iConnected 100 finds a network adapter with a connection state (the "yes" prong of block 206), iConnected thread execution then hands the connection request back to the operating system socket layer handler to make the connection to the requested URL (block 216). On failure to find a network adapter that is already connected through a network provider at the location to the Internet (the "no" prong of block 206), iConnected 100 assesses (scans) the available network providers from their broadcast access point identifiers, such as the subscriber set identifier (SSID) or base set identifier (BSID) or from base station identifiers, such as the network access provider identifier (NAPID), network service provider identifier (NSPID), etc. (block 208).

If there are no connection profiles provisioned on any of the network adapters for the network provider identifiers broadcast at the location (the "no" prong of block 210), iConnected 100 determines the capabilities of each available network providers (block 224). The capabilities may include, for example, signal strength, security, partner providers, and so on. In some embodiments, iConnected 100 assembles the capabilities of all the available discovered network providers for presentation on the dashboard 150 for selection of a preferred network provider by the user (block 226).

The iConnected method 100 redirects the URL to which connection is requested to the dashboard 150 (block 228), where it presents the capabilities of all the network of the available/discovered network providers to the user, advising the user of the available connection options, along with parameters such as signal strength, security, and partner providers (block 230). The user then selects a preferred network service provider (block 232). The iConnected method 100 then proceeds to the provisioning operation, described in detail in FIG. 5, below.

Where iConnected 100 is able to find a network adapter with a connection profile suitable to any one of the network providers available/discovered, as determined from the access point IDs or providers IDs match with the connection profile IDs, (the "yes" prong of block 210), iConnected 100 authenticates and connects to that network provider (block 214). (This is also the reentry point of the iConnected method 100 when the provisioning operations of FIG. 5 are completed (block 212). The iConnected method 100 thread execution then hands the connection request back to the operating system socket layer handler to make the connection to the requested URL (block 216). The selected network adapter accesses the URL (block 218), hoping to establish a connection to the requested web page. If for some reason the connection attempt is not successful as in the case of a stale or expired connection profile (the "no" prong of block 220), iConnected 100 again will go back through the thread execution to scan for any other network adapter that has a connection profile suitable to the network providers available or discovered at the location, and scans the SSID and BSID across all network adapters (block 208). If, instead, the web page access is successful, the iConnected method 100 brings the ConnectionReq out of its suspended state and attaches it to the network adapter that is provisioned for a connection to the Internet (block 222). The ConnectionReq then lands the user on the requested target destination/connection page (block 224).

FIG. 5 shows the provisioning phase of the iConnected method 100, according to some embodiments. Recall from FIG. 4 that the iConnected method 100 initiates the provisioning phase once the user selects a preferred network provider from the dashboard 150 of available network providers presented by iConnected 100 (FIG. 4, block 234). The dashboard 150 presented to the user is an active page from which scripts and domain name server (DNS) queries are run to discover the provisioning server for the preferred network provider the user selects (block 302). Once the provisioning server has been discovered, iConnected 100 performs the bootstrap procedure (block 304) to activate and provision the network adapter for the selected network provider. The user is landed on the provider portal to set up an account with the selected network provider (block 306). The iConnected method 100 then provisions the network adapter with subscription information, authentication credentials and connection parameters (block 308) and updates multiple-communication connection profiles (block 310). In this manner, the iConnected method 100 provides a uniform mechanism of provisioning the connection profiles managed by the multiple-communication connection managers developed by original equipment manufacturers (OEMs) or Third Party Vendors (TP) and installed as applications on the device.

After the connection profiles are updated, iConnected 100 performs post provisioning by restarting the selected network adapter (block 312) and entering the network with the provisioned credentials (block 314). At this point, iConnected 100 enters the thread execution in the iConnected engine (block 212 of FIG. 4) (block 316).

In some embodiments, the iConnected method 100 also creates connection profiles for different network adapters on the device, for connection to the different network providers through the bootstrap process, and for activating and provisioning the adapter for the selected network provider. This happens once the user has selected a preferred network provider from the dashboard 150 options presented by iConnected 100. The set of all such connection profiles associated to the different network adapters are shown in block 310.

Without such a cross-adapter connectivity monitor provided by the iConnected method 100, connectivity to a network such as the Internet is discovered when a connection request is initiated by an application. Connection failure is echoed by the application user interface (UI). After this point, it is up to the user to determine the reason of the connection failure and attempt repair.

Given that many access points assign a private Internet protocol (IP) address and landing page, the click-through search of the user is increased to discover an open path to the network. The user is expected to navigate all the access points available across the network adapters before selecting an access point for Internet access. With the iConnected method 100, the user has the information dashboard 150 of the available options, with parameters indicated, to ease the selection by the user.

Unlike multiple-communication connection managers, iConnected 100 establishes the ability to reach public Internet destinations, not just an IP assignment. IP assignments by most access points are restricted addresses requiring user registration. Further, in some embodiments, iConnected 100 works well with WiFi hotspot providers as well as 3G network providers to provision connection parameters and credentials, to ensure seamless connectivity. In some embodiments, iConnected 100 works across network adapters that are triggered by control packets sent down through any of the protocol stacks (TCP/IP, UDP, etc.) by any application.

On being triggered, iConnected 100 checks status across network adapter for connectedness and traffic. If the check returns at least one adapter connected with live traffic, iConnected 100 takes no action. If the status check returns none of the adapters connected or a stale connection, iConnected 100 takes investigative/corrective action.

The iConnected method 100 enables browser plug-ins for connection management, in some embodiments. Browser plug-ins do not have access to kernel-level processes. The iConnected method 100 enables scripts run by the browser for connection management.

The iConnected method 100 is not an application that needs to be separately installed. Conveniently, iConnected 100 integrates as part of the network adapter drivers by a network chip/module manufacturers, in some embodiments.

A monitor/repair execution thread generated using the iConnected 100 is triggered in the kernel mode on specific control packets sent down the stack by applications, in some embodiments. The iConnected method 100 is thus able to proactively discover connection options or setup connections for the user, unlike conventional connection managers. Further distinguishable from conventional connection managers, iConnected 100 establishes the ability to reach public Internet destinations, rather than simply accessing an IP assignment. IP assignments by most access providers are restricted addresses requiring user registration.

Provisioning of the connection profiles across the different wireless access technologies is harmonized by iConnected 100 into widely accepted and standardized provisioning and activation scheme. Thus, in some embodiments, iConnected 100 works well with WiFi hotspot providers as well as 3G network providers to provision the connection parameters and credentials, to ensure seamless connectivity.

The iConnected method 100 employs specific components/features not found in current connectivity management solutions. The dashboard 150 has the ability to manage network connections. The iConnected method 100 may be packaged as part of the driver package of the network chip/module manufacturer. The kernel mode operation of iConnected 100 works across adapters. The iConnected method 100 employs proactive connection discovery and set-up. The iConnected method 100 includes browser plug-ins for connection management. Finally, iConnected 100 extends universally accepted and standardized provisioning and activation schemes for provisioning and management of connections across multiple access technologies. The unique combination of components/techniques in iConnected 100 provides an improvement over previously known structures and techniques.

In some embodiments, iConnected 100 is implemented on a mobile device so as to be proprietary to the mobile platform, operating system, communication module, and the driver implementation. The driver shim 100 may be bundled as an embedded solution implemented in a management micro engine, driver package, or above the driver implementation as a software add-on.

Figure 6:
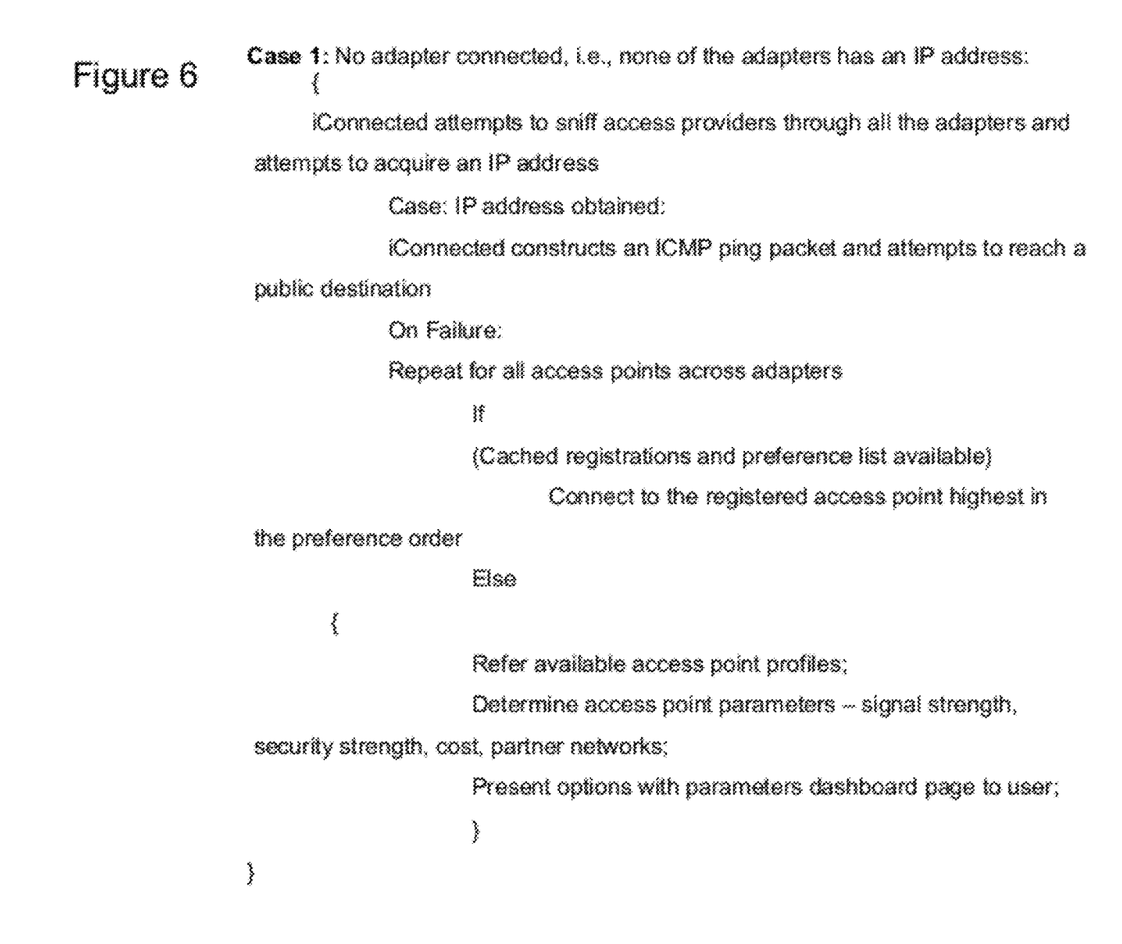
FIG. 6 is a pseudo-code representation of iConnected operation during network detection, according to some embodiments.
Figure 7:
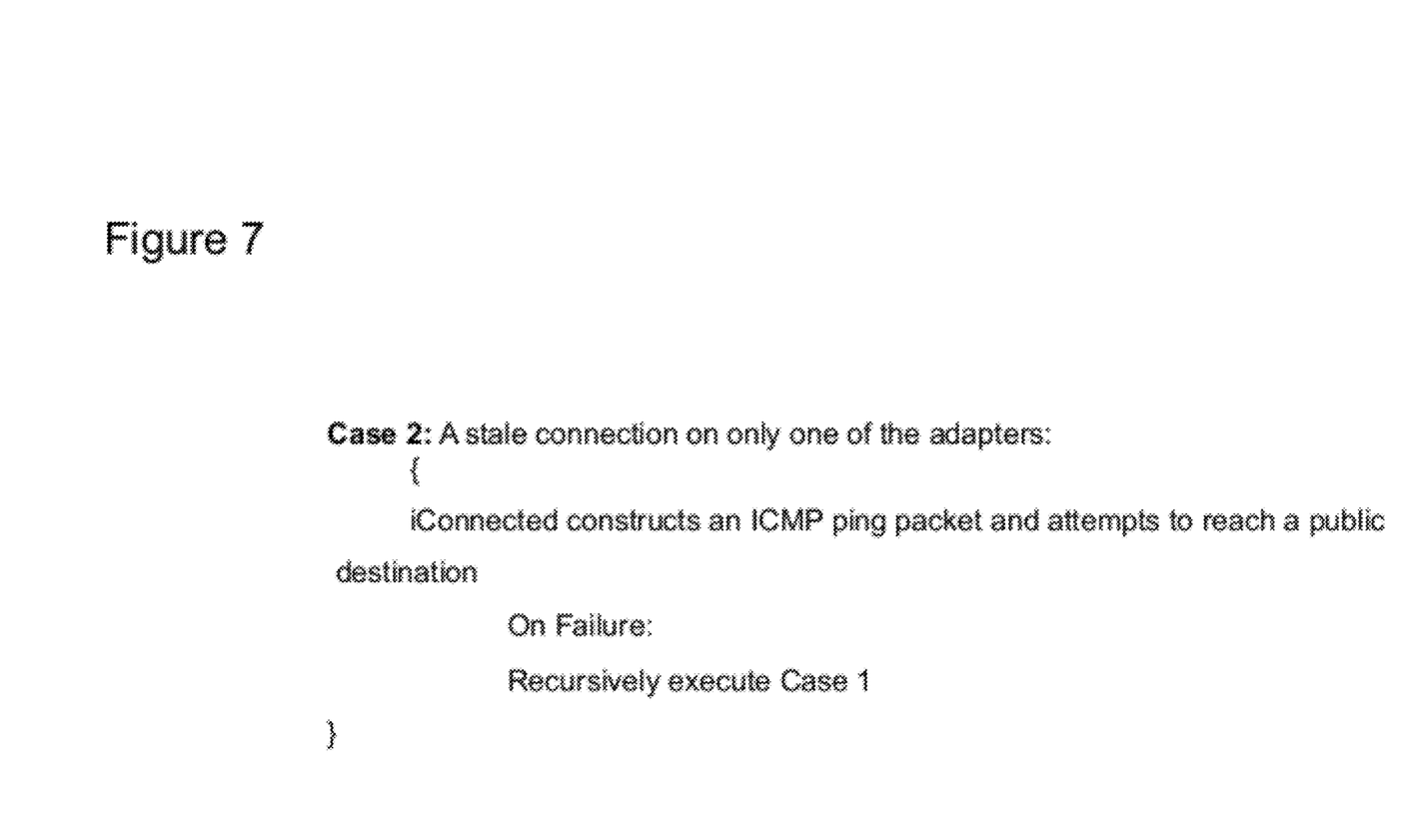
FIG. 7 is a pseudo-code representation of iConnected operation during network detection, according to some embodiments.

FIGS. 6 and 7 are pseudo-code representations of the iConnected method 100, according to some embodiments. In a first case (FIG. 6), there is no adapter connected, that is, none of the adapters in the device has an IP address. The iConnected method attempts to sniff access providers through all connected adapters and, from this investigation, tries to acquire an IP address. In some embodiments, iConnected 100 caches the registrations and preferences lists in a table. If an IP address is obtained at one adapter, iConnected 100 checks if the Internet destination is reachable. Otherwise, iConnected 100 checks the other adapters, one by one, for a connection profile for any of the available network providers at the location. The iConnected method 100 also determines the available network provider capabilities such as signal strength, security strength, partner networks, and so on, and presents these options to the user on the dashboard browser 150.

In a second case (FIG. 7), is if a stale connection exists on one of the adapters, i.e., a connection profile for an available network provider has expired or the account has been terminated. The iConnected method 100 constructs a ping packet and attempts to reach a public destination. If this does not work, the first case (FIG. 6) is recursively executed.

The iConnected method 100 is an innovative approach to promote simple activation and provisioning of new wireless services, such as WiMAX and WiFi-WiMAX bundling, as well as seamless connection to 3G and other network technologies. The existing connection manager technologies are difficult to customize and not quite user friendly.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method comprising:
   intercepting a connection request of an application/client, wherein the application/client is initiated following a user access request on a device;
   polling a plurality of network adapters of different types within the device for a connection state;
   establishing that a connection profile is provisioned on one network adapter of the plurality of network adapters for a network provider identifier broadcast at the device; and
   attaching the connection request to the network adapter;
   wherein the user accesses the requested application/client.

2. The method of claim 1, polling a plurality of network adapters within the device for a connection state further comprising:
   polling available WiFi network adapters;
   polling available WiMAX network adapters; and
   polling other network adapters.

3. The method of claim 1, establishing that a connection profile is provisioned on one network adapter of the plurality of network adapters for a network provider identifier broadcast at the device further comprising:
   failing to find a network adapter that is already connected through a network provider at the device;
   scanning across all network adapters to discover network providers, wherein the available network providers are scanned from their broadcast access point identifiers;
   presenting available network adapters and networks to the user in a dashboard, wherein the user is prompted to select one of the available networks from those presented; and
   provisioning the selected network to the network adapter.

4. The method of claim 3, further comprising:
   establishing a connection to an Internet destination, wherein the connection is either established without user interaction or established following selection by the user of one of the available networks presented by the dashboard.

5. The method of claim 3, further comprising:
   determining signal strength, security, and cost of available networks;
   assembling available network providers and corresponding capabilities for presentation to the dashboard; and
   redirecting the connection request destination to point to the dashboard.

6. The method of claim 3, further comprising:
   receiving a selection of a preferred network provider from the user; and
   provisioning one of the network adapters with a connection profile to establish a connection through the selected network provider.

7. The method of claim 6, provisioning one of the network adapters with a connection profile to establish a connection through the selected network provider further comprising:
   running domain name server queries to discover a provisioning server for the preferred network provider selected by the user;
   performing bootstrap operations to activate and provision the network adapter.

8. The method of claim 7, further comprising:
   landing the user on a provider portal of the selected network provider, wherein the user establishes an account with the network provider; and
   provisioning the device with subscription information, authentication credentials, and connection parameters.

9. The method of claim 8, further comprising:
   updating multiple-communication connection profiles for the device based on the provisioning;
   restarting the network adapter associated with the selected network provider; and
   entering the selected network with the provisioned authentication credentials.

10. A method comprising:
    presenting a list of available network service providers for selection by a user, wherein the network service providers are accessible by one or more network adapters in a processor-based system;
    discovering a provisioning server for a network service provider selected by the user;
    provisioning a connection profile for one of the one or more network adapters on the processor-based system, wherein the provisioned network adapter is associated with the selected network service provider; and
    connecting the provisioned network adapter to the selected network service provider using the connection profile;
    wherein an Internet connection is established following selection of a network provider by the user.

11. The method of claim 10, further comprising:
    intercepting a connection request made by the user for a client; and
    restoring the connection to the client once the connection between the network adapter and network service provider is established.

12. The method of claim 11, further comprising:
scanning all network adapters in the processor-based system to discover network providers; and
determining signal strength, security, cost, and other capabilities of available networks if no connection profiles are found.

13. The method of claim 10, further comprising:
performing bootstrap procedures based on discovered provisioning server associated with selected network provider; and
landing user on selected network provider portal to set up account.

14. The method of claim 13, further comprising:
provisioning the device with subscription information, authentication credentials, and connection parameters; and
restarting the selected network adapter.

15. The method of claim 14, further comprising:
entering the selected network with the provisioned credentials.

16. A processor-based system comprising:
an application program for accessing a network;
a plurality of network adapters, wherein one network adapter is a WiFi network adapter and another network adapter is not a WiFi network adapter; and
a driver shim to establish a connection to the network using either of the at least two network adapters, the driver shim to:
intercept access to the network by the application program;
poll the network adapters within the device for a connection state;
establish that a connection profile is provisioned on one network adapter of the plurality network adapters for a network provider identifier broadcast at the device; and
attach the connection request to the network adapter.

17. The processor-based system of claim 16, the driver shim to further:
determine signal strength, security, and cost of available networks;
assemble available network providers and corresponding capabilities for presentation to a dashboard; and
redirecting the connection request destination to point to the dashboard; wherein the user selects a preferred network provider from those presented to the dashboard.

18. The processor-based system of claim 17, the driver shim to further:
land the user on a provider portal of the selected network provider, wherein the user establishes an account with the network provider; and
provision the device with subscription information, authentication credentials, and connection parameters.

19. The processor-based system of claim 18, the driver shim to further:
run domain name server queries to discover a provisioning server for the preferred network provider selected by the user;
perform bootstrap operations to activate and provision the network adapter.

20. The processor-based system of claim 19, wherein a connection to the Internet is established if a network adapter and associated network provider are available.

* * * * *